Sept. 19, 1967     W. T. FLEMING     3,342,023

UPFLOW AIR OUTLET SHROUD

Filed June 26, 1964

INVENTOR.
William T. Fleming
BY
Walter S. Murray
ATTY.

United States Patent Office 3,342,023
Patented Sept. 19, 1967

3,342,023
UPFLOW AIR OUTLET SHROUD
William T. Fleming, Cincinnati, Ohio, assignor to The Kirk & Blum Manufacturing Co., Cincinnati, Ohio, a corporation of Ohio
Filed June 26, 1964, Ser. No. 378,252
1 Claim. (Cl. 55—414)

The present invention relates to improvements in weather protective, upflow air outlet shrouds that are particularly adaptable for use with the air outlets of vortical whirl type dust collectors, generally referred to as "cyclones." These cyclones are provided with upflow air outlets and are commonly located upon the roofs of factories, or the like, where their air discharge openings are exposed to all kinds of weather conditions.

It is an important object of the invention to provide an efficient, vertical air discharge outlet for cyclone type dust collectors while securing adequate protection of these cyclones from the elements and especially from precipitation in the form of rain, sleet or snow.

Another object of this invention is to provide an efficient and protective vertical air discharge outlet shroud for cyclones, or the like, which is greatly simplified in structure and has an adequate and substantially clog free drain for carrying off precipitation that may enter the shroud.

A further object of this invention is to provide a weather protective shroud unit for the upflow air discharge outlets of cyclone dust collectors wherein the air outlet passages will be adequate and unchanging in area whilst providing a positive self-cleaning means affording uninterrupted service of the shroud unit.

With these and other objects in view the invention consists of certain novel features of construction and operation as will be more fully described and particularly pointed out in the specification, drawings and in the claims appended hereto.

In the drawings which illustrate a preferred embodiment of my invention and wherein like reference numerals are used to designate like parts;

Figure 1:
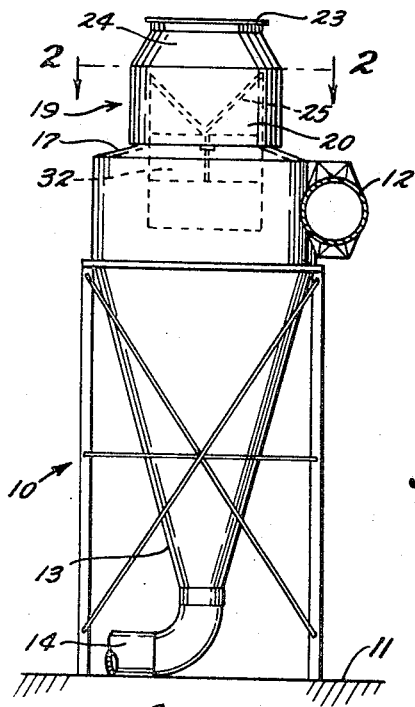
FIG. 1 is a side elevational view of a conventional cyclone dust collector installation with my upflow air outlet shroud unit thereon, parts being shown in section.

With reference to the drawings which show a preferred embodiment of my invention the numeral 10 indicates a conventional vortical whirl type gas separator generally referred to in the trade as a "cyclone" dust collector. The illustrated cyclone dust collector is usually located upon the roof 11 of a factory building and has a tangential and horizontal inlet 12 for the introduction of dust ladened air into the cyclone; the separated dust being collected in the bottom 13 of the collector and carried off through a suitable pipe 14. Cleaned air is discharged to atmosphere through an annular upflow air discharge mouth 15 in a vertically disposed, open-ended and cylindrically shaped tube 16 positioned in a central opening 18 of an upwardly and inwardly flaring top wall 17 of the collector.

A shroud, generally indicated by the reference numeral 19, is positioned upon the collector 10 coaxially with the upflow air discharge mouth 15 of the dust collector and consists of a lower, upstanding and cylindrical wall portion 20 disposed concentric with and having a larger diameter than said upflow discharge mouth 15. The shroud is positioned upon the top wall 17 of the collector by a number of angularly spaced apart feet 21 secured to the lower edge of the cylindrical wall portion 20 and mounted upon said top wall 17 of the collector as by suitable welds, or the like. The feet position the shroud in overlapping, spaced relationship with the upflow air discharge mouth 15 in vertically, spaced apart condition with the said collector top wall, to form an annular opening 22 (FIG. 3) between the lower edge of the cylindrical wall 20 of the shroud and the top wall 17 of the collector. The shroud is also provided with an annular, air outlet flange 23 in its upper portion, said flange being disposed concentric with and of substantially the same diameter as the upflow air discharge mouth 15 in the collector; the shroud having an upwardly and inwardly tapering intermediate wall portion 24 which connects together the upper edge of the cylindrical wall portion 20 and the air outlet flange 23 of the shroud.

Figure 2:
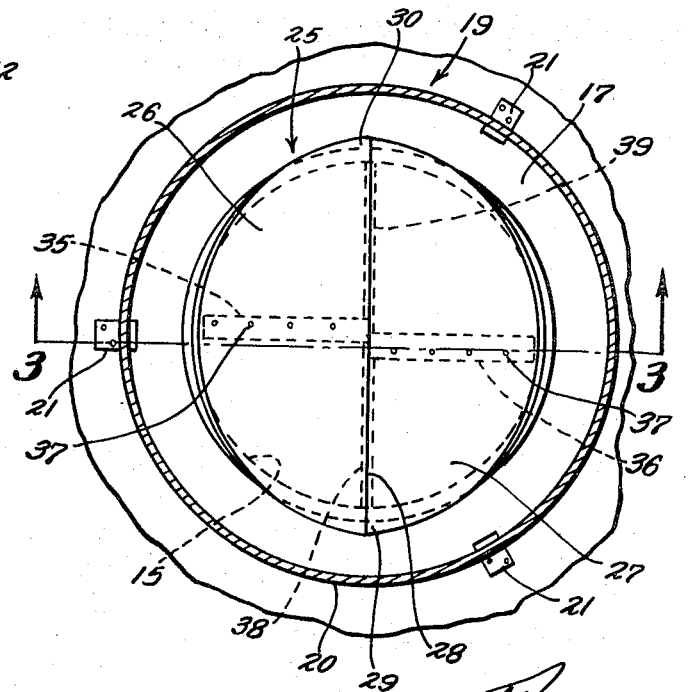
FIG. 2 is an enlarged, fragmental section taken on line 2—2 of FIG. 1.

A generally V-shaped deflector plate 25 is positioned within the space encompassed by the cylindrical wall portion 20 of the shroud and is preferably formed in one piece from an oval-shaped plate that has a small diameter greater than the overall diameter of the upflow air discharge mouth 15 of the collector. The two halves of the plate are bent upwardly along the small diameter of the plate to provide a pair of upwardly diverging deflector wings 26 and 27 joined together along their bottom edges by a centrally disposed, angular water conveying trough portion 28. As best shown in FIG. 2 the opposite ends 29 and 30 of this trough portion 28 extend over and beyond the diametrically opposed edge portions of the upflow air discharge mouth 15 of the collector to overhang the collector roof 17, whilst the marginal edges of the divergent deflector wings 26 and 27 project to the vertical projection lines of the air outlet flange 23 of the shroud and the upflow air discharge mouth 15 of the collector. Further, an annular space 31 is formed between the marginal edge of the positioned V-shaped deflector and the interior face of the cylindrical wall 20 of the collector and has an area equal to or somewhat larger than the area of the upflow air discharge mouth 15 of the collector.

Figure 3:
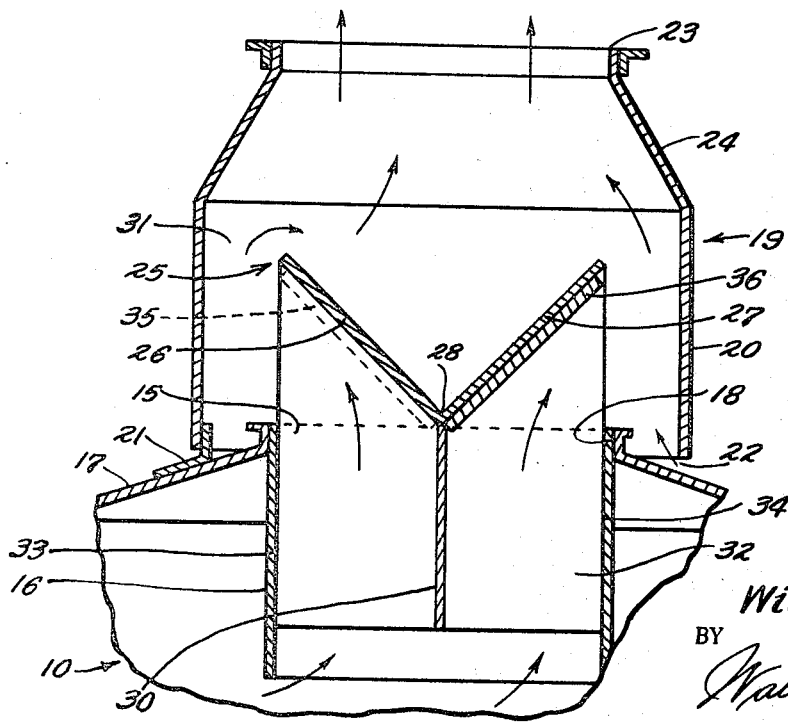
FIG. 3 is a section taken on line 3—3 of FIG. 2.

The V-shaped deflector plate is suitably positioned within the shroud 19 by an upstanding baffle plate 32 having its lower portion extending diametrically across the interior of the discharge tube 16 and positioned therein as by welding the opposite vertical edges 33 and 34 of the plate to the interior face of said tube. The upper portion of the baffle plate 32 projects into the shroud and has a pair of intersecting, upwardly divergent edges, each having an out-turned flange 35 and 36 formed thereon which are respectively secured by spot welding 37 (FIG. 2), or the like, to the undersides of the wings 26 and 27 of the deflector plate 25. In larger shroud constructions additional baffle plates 38 and 39 may be positioned within the air discharge tube 16 to extend at right angles from opposite sides of the central, lower portion of the baffle plate 32 to the interior wall of said tube 16. As best shown in FIG. 3 the underside of the trough portion 28 is in abutment with the upper edges of the baffle plates 38 and 39.

In operation, when the collector is not in use, it will be understood that precipitation in the form of rain, or snow, will fall by gravity through the air outlet flange 23 of the shroud 19 and be deposited only upon the upturned faces of the deflector wings 26 and 27; said deflector and the shroud construction protecting the interior of the collector from the precipitant. Rain or subsequently melted snow or sleet will run down the said deflector wing faces into the trough portion 28 and be conveyed diametrically thereacross to the trough ends 29 and 30 that project beyond the upflow air discharge mouth 15 of the collector; said water falling by gravity upon the top wall 17 of the collector and thence through the opening 22 and over the collector sides. During operation of the cyclone vortically whirling, cleaned air is discharged through the outlet 15 of the collector, the baffle plate 32 and in some instances baffle plates 38 and 39 serving to lessen its whirling motion. The cleaned air discharged from the mouth 15 will impinge on the undersides of the deflector wings 26 and 27 and be deflected thereby outwardly through the annular space 31, said annular space being ample to provide free passage of the discharged air through the shroud to provide vertical discharge of the air to atmosphere through the flange 23 and preclude any build up of back pressure in the cyclone itself. The annular opening 22 between the lower edge of the shroud and the upflow air discharge mouth of the collector provides for passage of water discharged by gravity from the deflector over the top of the collector whilst securing a breather space that will compensate for varying pressure within the shroud. During operation of the cyclone and also while the cyclone is shut down some foreign particles will collect on the upturned faces and in the trough portion of the deflector plate. All the deposited particles will be carried away via the trough and the collector top each time rain falls on the deflector or when sleet or snow deposited thereon is melted by the discharge of upflow air from the collector.

What is claimed is:

A cyclone having a roof, an upstanding cylindrical tube extending through and above the central portion of the roof and constituting an outlet opening for the cyclone, a weather protective shroud mounted on said roof over said outlet opening, said shroud comprising a lower cylindrical wall portion concentric with the outlet opening and having a larger diameter than said opening, means supporting the cylindrical wall portion upon the cyclone with its lower end disposed below the outlet opening and in spaced relation with the roof to form a circular breather space and a water discharge opening for the shroud, a circular air outlet flange formed on the upper portion of the shroud and disposed concentric with and of substantially the same diameter as the outlet opening, said shroud having an upwardly and inwardly tapering intermediate wall portion connecting the upper edge of the cylindrical wall portion to the air outlet flange of the shroud, a generally V-shaped deflector disposed within the space encompassed by the cylindrical wall portion of the shroud and formed from an oval-shaped plate having a small diameter greater than the diameter of the outlet opening, said deflector having upwardly divergent wing portions connected together along a centrally disposed angular trough portion, said trough portion extending diametrically across and beyond the outlet opening with the trough ends terminating in spaced relation to the interior face of the cylindrical wall portion of the shroud, the marginal edge of the V-shaped deflector extending to the vertical extension lines of the outlet opening, an annular chamber formed between the marginal edge of the V-shaped deflector and the interior face of the cylindrical wall portion of the shroud and having a capacity substantially the capacity of the outlet opening of the cyclone, a baffle plate mounted within the tube on a diameter thereof and extending upwardly into the shroud beyond the outlet opening, the upper portion of the baffle plate having upwardly divergent top edges, and fastening means securing each upwardly divergent edge of the baffle plate to the underside of a wing on the deflector.

References Cited

UNITED STATES PATENTS

| 144,884 | 11/1873 | Bishop | 55—413 |
|---|---|---|---|
| 144,932 | 11/1873 | Swenson. | |
| 199,599 | 1/1878 | Walker | 98—66 |
| 241,875 | 5/1881 | McKenzie. | |
| 590,012 | 9/1897 | Abbott et al. | 98—66 X |
| 1,996,098 | 4/1935 | Chase | 98—66 X |
| 2,164,987 | 7/1939 | Cover. | |
| 2,482,577 | 9/1949 | Dahlstrom | 98—60 |
| 2,554,167 | 5/1951 | Anderson | 98—60 |
| 3,181,451 | 5/1965 | Hess | 98—59 |

FOREIGN PATENTS

| 1,287,556 | 2/1962 | France. |
|---|---|---|
| 202,392 | 10/1908 | Germany. |
| 330,172 | 10/1935 | Italy. |

HARRY B. THORNTON, *Primary Examiner.*

D. TALBERT, *Assistant Examiner.*